United States Patent
Bonasia et al.

(10) Patent No.: US 8,199,446 B2
(45) Date of Patent: *Jun. 12, 2012

(54) CIRCUIT INTERRUPTING SYSTEM WITH REMOTE TEST AND RESET ACTIVATION

(75) Inventors: Gaetano Bonasia, Bronx, NY (US); Kangpin Tee, Brooklyn, NY (US); Maxim Laurent, Brooklyn, NY (US)

(73) Assignee: Leviton Manufacturing Company, Inc., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/156,336

(22) Filed: Jun. 8, 2011

(65) Prior Publication Data

US 2011/0279932 A1    Nov. 17, 2011

Related U.S. Application Data

(63) Continuation of application No. 12/254,105, filed on Oct. 20, 2008, now abandoned, which is a continuation-in-part of application No. 11/234,185, filed on Sep. 26, 2005, now Pat. No. 7,440,246.

(60) Provisional application No. 60/619,115, filed on Oct. 15, 2004.

(51) Int. Cl.
H02H 3/00    (2006.01)
H02H 9/08    (2006.01)

(52) U.S. Cl. .......................................... 361/42
(58) Field of Classification Search ....................... 361/42
See application file for complete search history.

(56) References Cited

U.S. PATENT DOCUMENTS

| | | | |
|---|---|---|---|
| 4,138,684 A | 2/1979 | Kerr |
| 4,334,171 A | 6/1982 | Parman et al. |
| 4,578,732 A | 3/1986 | Draper et al. |
| 4,598,331 A | 7/1986 | Legatti |
| 4,924,151 A | 5/1990 | D'Aleo et al. |
| 4,939,792 A | 7/1990 | Urbish et al. |
| 5,038,081 A | 8/1991 | Maiale, Jr. et al. |
| 5,059,871 A | 10/1991 | Pearlman et al. |
| 5,079,559 A | 1/1992 | Umetsu et al. |
| 5,101,141 A | 3/1992 | Warner et al. |
| 5,177,657 A | 1/1993 | Baer et al. |
| 5,191,265 A | 3/1993 | D'Aleo et al. |

(Continued)

FOREIGN PATENT DOCUMENTS

WO    WO2007143576    12/2007

(Continued)

OTHER PUBLICATIONS

Written Opinion / Search Report for International Application No. PCT/IB2009/007317 mailed on Jun. 22, 2010, 7 pages.

(Continued)

*Primary Examiner* — Dharti Patel
(74) *Attorney, Agent, or Firm* — Collard & Roe, P.C.

(57) ABSTRACT

The present disclosure relates to a circuit interrupting device and system capable of being tested and reset from remote locations, and in particular to circuit interrupting devices and system capable of being tested and reset from remote locations. A remote monitoring device can also be included which can be used to control an actuation device which is capable of controlling a circuit interrupting device. Alternatively the remote monitoring or control device can be used to control the device directly.

18 Claims, 15 Drawing Sheets

U.S. PATENT DOCUMENTS

| | | | |
|---|---|---|---|
| 5,225,765 A | 7/1993 | Callahan et al. |
| 5,239,205 A | 8/1993 | Hoffman et al. |
| 5,248,919 A | 9/1993 | Hanna et al. |
| 5,309,310 A | 5/1994 | Baer et al. |
| 5,309,311 A | 5/1994 | Ballada |
| 5,319,301 A | 6/1994 | Callahan et al. |
| 5,400,041 A | 3/1995 | Strickland |
| 5,430,356 A | 7/1995 | Ference et al. |
| 5,510,679 A | 4/1996 | Maiale, Jr. et al. |
| 5,530,322 A | 6/1996 | Ference et al. |
| 5,568,344 A | 10/1996 | Gernhardt et al. |
| 5,680,287 A | 10/1997 | Gernhardt et al. |
| 5,684,272 A | 11/1997 | Gernhardt et al. |
| 5,712,450 A | 1/1998 | Chan et al. |
| 5,736,965 A | 4/1998 | Mosebrook et al. |
| 5,864,455 A | 1/1999 | Gernhardt et al. |
| 5,867,127 A | 2/1999 | Black et al. |
| 5,875,087 A | 2/1999 | Spencer et al. |
| 5,982,103 A | 11/1999 | Mosebrook et al. |
| 5,982,596 A | 11/1999 | Spencer et al. |
| 6,046,550 A | 4/2000 | Ference et al. |
| 6,052,265 A | 4/2000 | Zaretsky et al. |
| 6,091,205 A | 7/2000 | Newman, Jr. et al. |
| 6,211,626 B1 | 4/2001 | Lys et al. |
| 6,215,102 B1 | 4/2001 | Jones |
| 6,297,724 B1 | 10/2001 | Bryans et al. |
| 6,340,868 B1 | 1/2002 | Lys et al. |
| 6,347,028 B1 | 2/2002 | Hausman, Jr. et al. |
| 6,369,524 B1 | 4/2002 | Sid |
| 6,380,692 B1 | 4/2002 | Newman, Jr. et al. |
| 6,381,113 B1 * | 4/2002 | Legatti ............................ 361/46 |
| 6,421,214 B1 | 7/2002 | Packard et al. |
| 6,459,919 B1 | 10/2002 | Lys et al. |
| 6,469,547 B1 | 10/2002 | Rabii |
| 6,507,158 B1 | 1/2003 | Wang |
| 6,528,957 B1 | 3/2003 | Luchaco |
| 6,761,470 B2 | 7/2004 | Sid |
| 6,798,341 B1 | 9/2004 | Eckel et al. |
| 6,807,035 B1 | 10/2004 | Baldwin et al. |
| 6,807,036 B2 | 10/2004 | Baldwin |
| 6,897,783 B2 | 5/2005 | Zeng et al. |
| 6,901,439 B1 | 5/2005 | Bonasia et al. |
| 6,917,167 B2 | 7/2005 | Courtney et al. |
| D519,937 S | 5/2006 | Laurent et al. |
| D519,938 S | 5/2006 | Laurent et al. |
| D520,961 S | 5/2006 | Laurent et al. |
| D521,457 S | 5/2006 | Laurent et al. |
| 7,038,910 B1 | 5/2006 | Hodge et al. |
| 7,071,634 B2 | 7/2006 | Johnson et al. |
| 7,106,261 B2 | 9/2006 | Nagel et al. |
| 7,164,238 B2 | 1/2007 | Kazanov et al. |
| 7,166,970 B2 | 1/2007 | Johnson et al. |
| 7,219,141 B2 | 5/2007 | Bonasia et al. |
| 7,312,964 B2 | 12/2007 | Tchernobrivets |
| 7,372,678 B2 | 5/2008 | DiSalvo et al. |
| 7,440,276 B1 | 10/2008 | Chen |
| 7,800,784 B2 | 9/2010 | Kawanabe et al. |
| 2001/0015862 A1 | 8/2001 | Lynam et al. |
| 2003/0076281 A1 | 4/2003 | Morgan et al. |
| 2003/0233129 A1 | 12/2003 | Matos |
| 2004/0002792 A1 | 1/2004 | Hoffknecht |
| 2004/0212324 A1 | 10/2004 | Callahan |
| 2005/0025496 A1 | 2/2005 | Akita et al. |
| 2005/0043907 A1 | 2/2005 | Eckel et al. |
| 2005/0063535 A1 | 3/2005 | Walbeck et al. |
| 2005/0125083 A1 | 6/2005 | Kiko |
| 2005/0248300 A1 | 11/2005 | Walko et al. |
| 2005/0280598 A1 | 12/2005 | Webb et al. |
| 2006/0049935 A1 | 3/2006 | Giannopoulos et al. |
| 2006/0051079 A1 | 3/2006 | Gerhardinger et al. |
| 2006/0152867 A1 | 7/2006 | Bonasia et al. |
| 2006/0279236 A1 | 12/2006 | Johnson et al. |
| 2007/0162536 A1 | 7/2007 | Ostrovsky et al. |
| 2008/0007879 A1 | 1/2008 | Zaretsky et al. |
| 2008/0013227 A1 | 1/2008 | Mernyk et al. |
| 2009/0040667 A1 | 2/2009 | DiSalvo et al. |

FOREIGN PATENT DOCUMENTS

WO    WO2009097469    8/2009

OTHER PUBLICATIONS

International Preliminary Report on Patentability for International Application No. PCT/IB2009/007317 mailed on May 5, 2011.
Non Final Rejection dated Sep. 30, 2010 for U.S. Appl. No. 12/254,105.
Non Final Rejection dated Feb. 17, 2010 for U.S. Appl. No. 12/254,105.
Final Rejection dated Mar. 8, 2011 for U.S. Appl. No. 12/254,105.
Notice of Allowance dated Jun. 16, 2008 for U.S. Appl. No. 11/234,185.
Notice of Allowance dated Mar. 18, 2008 for U.S. Appl. No. 11/234,185.
Non Final Rejection dated Sep. 10, 2007 for U.S. Appl. No. 11/234,185.
Non Final Rejection dated Sep. 21, 2006 for U.S. Appl. No. 11/234,185.
Final Rejection dated Jan. 29, 2007 for U.S. Appl. No. 11/234,185.

* cited by examiner

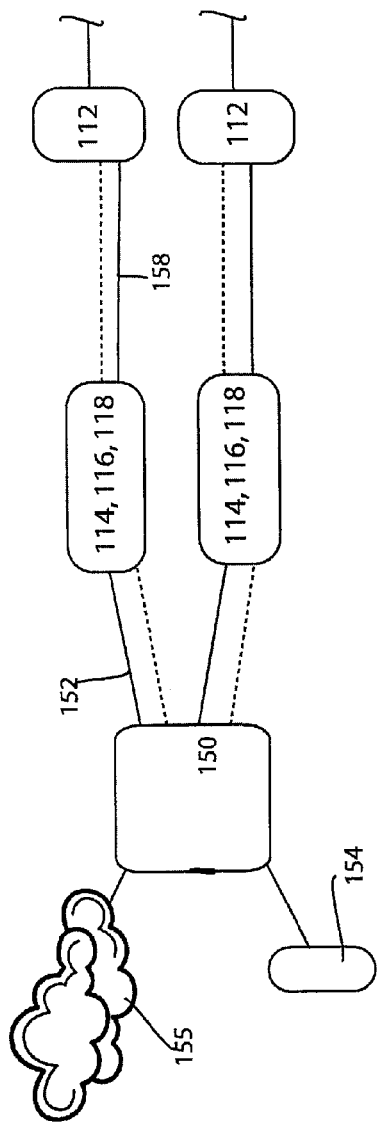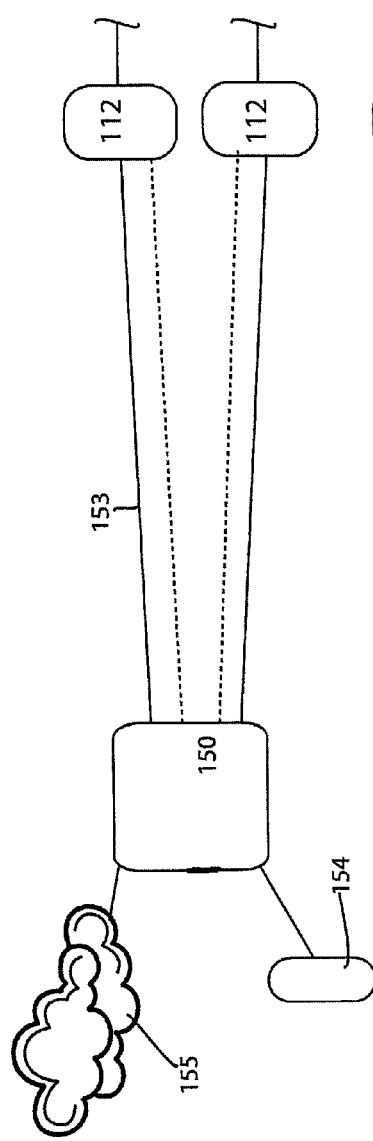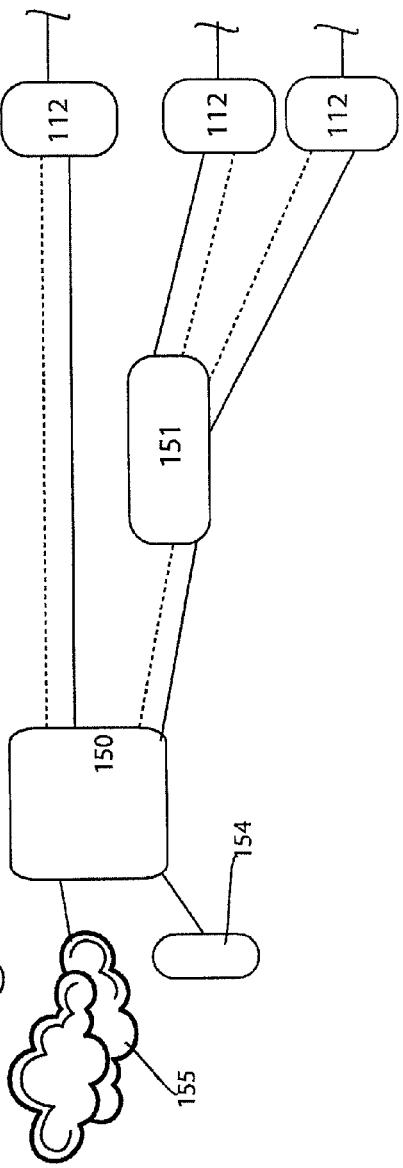

CIRCUIT INTERRUPTING SYSTEM WITH REMOTE TEST AND RESET ACTIVATION

CROSS REFERENCE TO RELATED APPLICATIONS

This application is a continuation of U.S. patent application Ser. No. 12/254,105 filed on Oct. 20, 2009, wherein that application is a continuation in part application of U.S. patent application Ser. No. 11/234,185 filed on Sep. 26, 2005, which has issued as U.S. Pat. No. 7,440,246 on Oct. 21, 2008, wherein that application is related to and claims priority of U.S. Provisional Patent Application No. 60/619,115, filed Oct. 15, 2004, and entitled "Ground Fault Circuit Interrupter With Remote Test and Reset," wherein the disclosure of each of these applications are hereby incorporated herein by reference in their entirety.

BACKGROUND

The present disclosure relates to resettable circuit interrupting devices and assemblies capable of being tested and reset from remote locations, and include without limitation ground fault circuit interrupters (GFCI's), arc fault circuit interrupters (AFCI's), immersion detection circuit interrupters (IDCI's), appliance leakage circuit interrupters (ALCI's), and equipment leakage circuit interrupters (ELCI's), A proposal has been introduced to the National Electric Code (NEC) Section 422.16(B)(4) that would require new and remanufactured vending machines to have installed at the factory a power cord or cable assembly that includes a ground fault type circuit interrupting device. In a typical environment where a vending machine is located, a cable assembly with a ground fault type circuit interrupting device would be located in the rear of the vending machine and plugged into a wall outlet typically behind the vending machine. To test the ground fault type circuit interrupting device, the vending machine would have to be moved away from the wall to gain access to the circuit interrupting device. Since vending machines are typically heavy and the location of the wall outlet and rear cable assembly make it difficult and inconvenient to perform periodic testing of the ground fault type circuit interrupting device. Moreover, Underwriters' Laboratories (UL) has issued a requirement for periodic and convenient testing of ground fault type circuit interrupting devices.

SUMMARY

The present disclosure relates to circuit interrupting devices and system capable of being tested and reset from remote locations. In one embodiment, there may be a wall mounted receptacle circuit interrupter which is capable of being tested and reset from a remote location. In one embodiment, a portable circuit interrupting system includes a plug assembly, a connector, and a circuit interrupting device located between the plug assembly and connector. Alternatively, the circuit interrupting system can be constructed such that instead of a connector, the load side of the system can be hard wired to the load, to which it supplies power. Thus, in this configuration, the system would be in the form of a power supply cord. The circuit interrupting device can be in any form and can include any circuitry necessary to create an interruption in a circuit if a fault condition is detected. The circuit interrupting device is connected to the plug assembly and connector by one or more cables, and is configured to change from a reset state to a trip state upon the occurrence of a predetermined condition, such as a ground fault. The circuit interrupting device also includes test circuitry configured to cause the circuit interrupting device to change from the reset state to the trip state when activated, and reset circuitry configured to cause the circuit interrupting device to change from the tripped state to the reset state when activated.

At least one activating device is provided to remotely activate the test circuitry or the reset circuitry. The activating device can be in the form of any viable activating device that activates the test circuitry or reset circuitry on the circuit interrupting device, or any circuitry that simply activates or communicates with the circuit interrupting device to communicate or display the status of the circuit interrupting device. The activating device may be a wireless device that activates the test circuitry or the reset circuitry by transmitting a wireless signal to the circuit interrupting device, or the activating device may be hard wired to the circuit interrupting device and activates the test circuitry or the reset circuitry by sending a signal along the hard wire to the circuit interrupting device. The activating device may be included in the connector or a stand alone device. In an alternative embodiment, the portable circuit interrupting system includes a plug assembly, a circuit interrupting device connected to the plug assembly and at least one activating device operatively coupled to the circuit interrupting device. The circuit interrupting device is preferably configured to change from a reset state to a trip state upon the occurrence of a predetermined condition, such as a ground fault. The circuit interrupting device includes test circuitry configured to cause the circuit interrupting device to change from the reset state to the trip state when activated, and reset circuitry configured to cause the circuit interrupting device to change from the tripped state to the reset state when activated. At least one activating device is provided to remotely activate the test circuitry or the reset circuitry. The activating device may be a wireless device that activates the test circuitry or the reset circuitry by transmitting a wireless signal to the circuit interrupting device, or the activating device may be hard wired to the circuit interrupting device and activates the test circuitry or the reset circuitry by sending a signal along the hard wire to the circuit interrupting device. In another embodiment, the portable circuit interrupting system includes a plug assembly having a circuit interrupting device included in the plug assembly, and at least one activating device capable of remotely activating the test circuitry or reset circuitry.

In at least one alternative embodiment, a remote monitoring device can be connected to a remote activation device to control the remote activation device, or be in direct communication with a fault circuit to control the fault circuit. The communication can be either via wired communication means or wireless. In addition, if the communication is via wired lines, the wired lines can be configured for X-10 communication or any suitable communication protocol or the wired communication lines can be in the form of fiber optic lines.

This remote monitoring device can also be in the form of a remote monitoring and activating device for remotely acting on either the activating device, or acting directly on the fault circuit device.

The remote monitoring device or remote control device can be in any form that would include a display or some indicators which disclose the status of the fault circuit interrupter or the position of the test and reset buttons on either the activation device or the fault circuit interrupter itself. The indication means can be via either graphical representation or via text messaging. In at least one embodiment the remote monitoring device can be in the form of a personal computer, a server or any other suitable type device for displaying or controlling the status of either the activating device or the fault circuit device. This remote monitoring device can use either customized or off the shelf software which allows for this remote monitoring device to be housed in a central station to monitor many GFCI's and allow for each GFCI to be capable of having its own identifier or addressable component. In this case each GFCI is then disposed on a network wherein each GFCI is a node.

Along with the device, there is also a method for communicating with a fault circuit. The method includes providing a fault circuit interrupter with test circuitry. Another step includes providing a remote testing device and then testing the fault circuit interrupter from a remote location. This method includes testing the fault circuit interrupter by testing via a wireless protocol to the fault circuit interrupter. This step includes wirelessly testing the fault circuit interrupter, and comprises sending a wireless command from the remote testing device to the fault circuit interrupter, receiving this command in the fault circuit interrupter, and then conducting a test of the fault circuit interrupter.

One of the benefits of this design, is that with the addressable component and with the use of text messaging or other protocols, a user can pinpoint the location of perishable food or other items that may be involved.

BRIEF DESCRIPTION OF THE DRAWINGS

FIG. 9A is a schematic block diagram of a layout including a remote control device;

FIG. 9B is a schematic block diagram of a layout including a remote control device communicating directly with a fault circuit interrupter;

FIG. 9C is a schematic block diagram of a remote control device communicating through another remote control device to a fault circuit interrupter;

DETAILED DESCRIPTION

Figure 1:
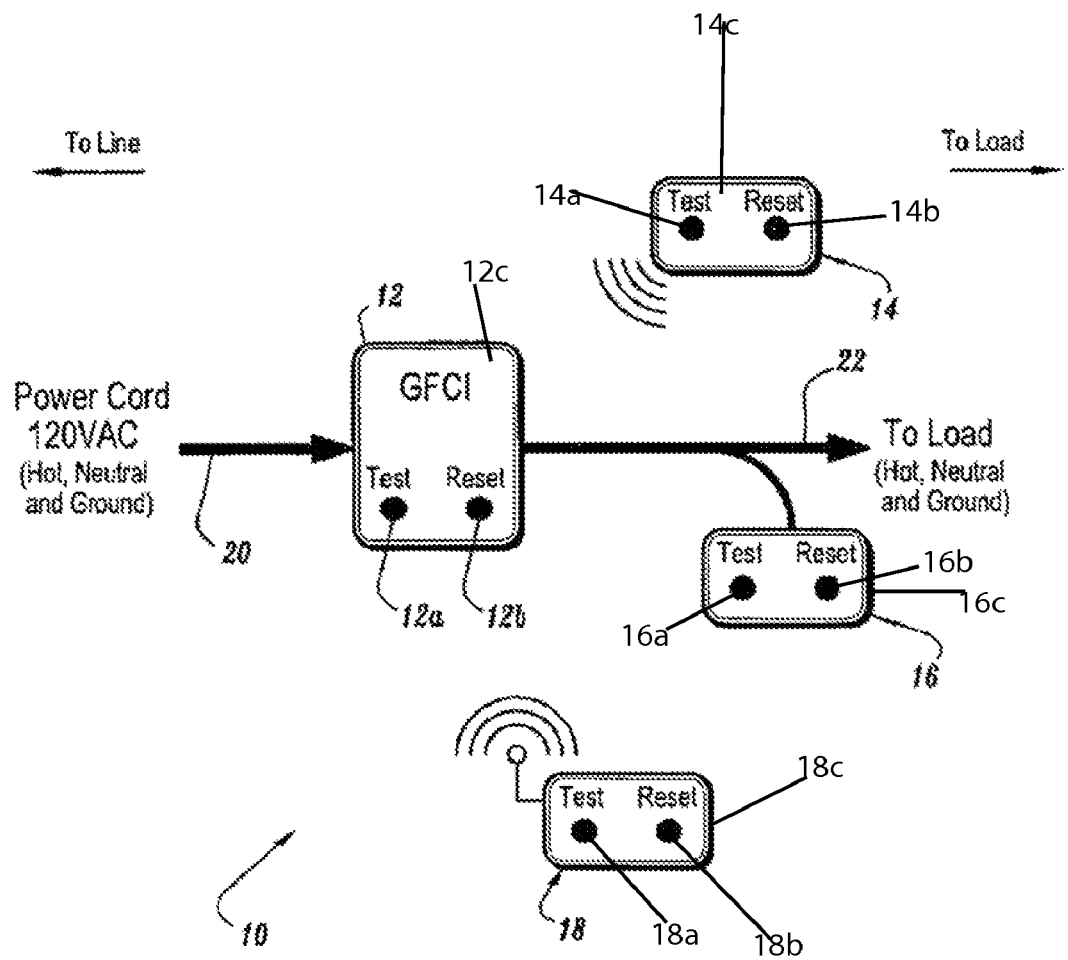
FIG. 1 is a block diagram of a GFCI with remote test and reset functionality in accordance with an embodiment of the present disclosure.

As noted, the present disclosure relates to resettable circuit interrupting devices or systems and assemblies capable of being tested and reset from remote locations and in particular to portable circuit interrupting system capable of being tested and reset from remote locations. The type of circuit interrupting devices contemplated by the present disclosure include without limitation ground fault type circuit interrupting devices, arc fault circuit interrupting devices, immersion detection circuit interrupting devices, appliance leakage circuit interrupting devices, and equipment leakage circuit interrupting devices. However, for ease of description and without departing from the full scope of the family of circuit interrupting devices, the following description will be directed to ground fault circuit interrupting devices. Referring to FIG. 1, a portable circuit interrupting system 10 with remote test and reset functionality in accordance with one embodiment of the present disclosure is provided. The portable circuit interrupting system 10 can be a power cord assembly, a cable assembly or any other portable structure capable of supplying power from a fixed power source to a load, such as a commercial, industrial or home appliance. The present disclosure applies equally well to a wall mount circuit interrupter.

In the embodiment of FIG. 1, the circuit interrupting system 10 includes a ground fault type circuit interrupting device 12 having a housing 12c and activating devices 14, 16 or 18 each having respective housings 14c, 16c, and 18c. Any of these activating devices 14, 16 or 18 can be characterized as remote activating devices. Activating device 14 has a test button 14a, a reset button 14b, activating device 16 has a test button 16a, and a reset button 16b, while activating device 18 has a test button 18a, and a reset button 18b. While FIG. 1 illustrates multiple activating devices, one or more of the activating devices 14, 16 or 18 can be included in the circuit interrupting assembly 10. The circuit interrupting device 12 has a line side portion that includes a power cord or cable 20 having a plug assembly for connection to a fixed source of electrical power, e.g., a wall mounted outlet (not shown), for providing electrical power to a load. The circuit interrupting device 12 has a load side that includes a load side power cord or cable 22 with electrical power conductors ending in a connector (e.g., a female receptacle, not shown) that connects to an electrical load (not shown), such as a vending machine or other commercial, industrial or home electrical machine. Alternatively the circuit interrupting system can be constructed such that instead of a connector, the load side of the system can be hard wired to the load to which it supplies power. Thus, in this configuration the system would be known as a power supply cord. Between the line side and load side of the circuit interrupting device are conductive paths. Typically, there is a phase conductive path and a neutral conductive path and a ground conductive path. While a single phase system is described here, this system would function equally well in a multi-phase system. The cable 20 and plug assembly and the connector are electrical components for handling electrical power over phase, neutral and ground conductors. The circuit interrupting device 12 also includes fault sensing circuitry used to monitor the electrical power flowing through the line side phase and neutral conductive paths of cable 20, and a trip mechanism used to change the state of the circuit interrupting device between a reset state and a tripped state. In the reset state there is electrical continuity in the phase and neutral conductive paths between the line side and load side of the circuit interrupting device 12. In the tripped state there is electrical discontinuity in the phase and neutral conductive paths between the line side and load side of the circuit interrupting device 12. When a fault condition is detected by the fault sensing circuitry the trip mechanism causes the circuit interrupting device to change from the reset state to the tripped state. Examples of fault conditions the fault sensing circuitry may detect include ground faults, arc faults, appliance leakage faults, immersion detection faults, or equipment leakage faults. The trip mechanism may utilize electromechanical or electrical components or both to change the state of the circuit interrupting device 12. That is, the trip mechanism may use electromechanical or electrical components or both to cause electrical discontinuity in the phase and neutral conductive paths between the line side and load side of the circuit interrupting device (the tripped state), or the trip mechanism may use electro-mechanical or electrical components or both to cause electrical continuity in the phase and neutral conductive paths between the line side and load side of the circuit interrupting device (the reset state). An example of the fault sensing circuitry and the trip mechanism can be found in commonly owned U.S. Pat. No. 4,595,894, which is incorporated herein in its entirety by reference.

The circuit interrupting device 12 also includes test circuitry and reset circuitry that can be manually activated by buttons 12a, 12b or remotely activated as will be described below. The test circuitry is used to test all or part of the fault sensing circuitry, the trip mechanism, or both the fault sensing circuitry and the trip mechanism of the circuit interrupting device 12. The reset circuitry is used to cause the trip mechanism to return to the reset state, i.e., to re-establish electrical continuity in the phase and neutral conductive paths after the circuit interrupting device 12 has been tested or a fault condition detected. Examples of the test circuitry and the reset circuitry can be found in commonly owned U.S. Pat. No. 4,595,894. It should be noted that the circuit interrupting device may optionally include reset lockout functionality to prevent the circuit interrupting device from changing to the reset state in the event all or part of the fault sensing circuitry, all or part of the trip mechanism or all or part of the test circuitry are inoperative. Examples of reset lockout features are described in commonly owned U.S. Pat. No. 6,282,070, which is incorporated herein in its entirety by reference.

For remote activation of the test circuitry or the reset circuitry the circuit interrupting device may be configured for hard wire communications to the one or more activating devices 14, 16 or 18 via additional conductors in cable 22. In addition to or instead of hard wire communication, the circuit interrupting device may include wireless communication circuitry connected to the test circuitry and the reset circuitry. The communication circuitry enables remote activation of all or part of the test circuitry, all or part of the reset circuitry, or all or part of the test and reset circuitry. The wireless communication circuitry contemplated by the present disclosure covers the complete spectrum of wireless communication circuits including infra-red communication circuitry, radio frequency communication circuitry, optical transmission, audio transmission, ultrasonic transmission, or any other technique for wireless communications. Typically, the communication circuitry includes a receiver for receiving wireless signals and adapter circuitry for adapting the received wireless signal to a form capable of communicating with the test circuitry or the reset circuitry.

As noted the test and reset circuitry of the circuit interrupting device 12 can be remotely activated by one or more activating devices 14, 16 or 18. The activating devices 14, 16 or 18 include user accessible buttons (e.g., test and/or reset buttons) 14a, 14b, 16a, 16b, and 18a and 18b respectively, to remotely activate the test circuitry or reset circuitry of the circuit interrupting device 12. As noted, various communication techniques may be utilized. For example, as seen in FIG. 1, activating device 16 is hard wired to the circuit interrupting device 12 via cable 22. Activating device 14 uses infra-red (IR) communications and activating device 18 uses radio frequency (RF) communications. Both the activating device 14 and activating device 18 would typically include a transmitter for transmitting a test or reset signal generated when either the test or reset button is activated.

Although three activating devices have been shown it should be understood that the number and type of activating devices can vary depending on the application. Moreover, an activating device can use various communication techniques to activate the test circuitry or reset circuitry of the circuit interrupting device 12, such as, for example, power-line-carrier, twisted pair, fiber optic, light or wave guide, natural or artificial light, magnetic or electrical means or other techniques.

Figure 2:
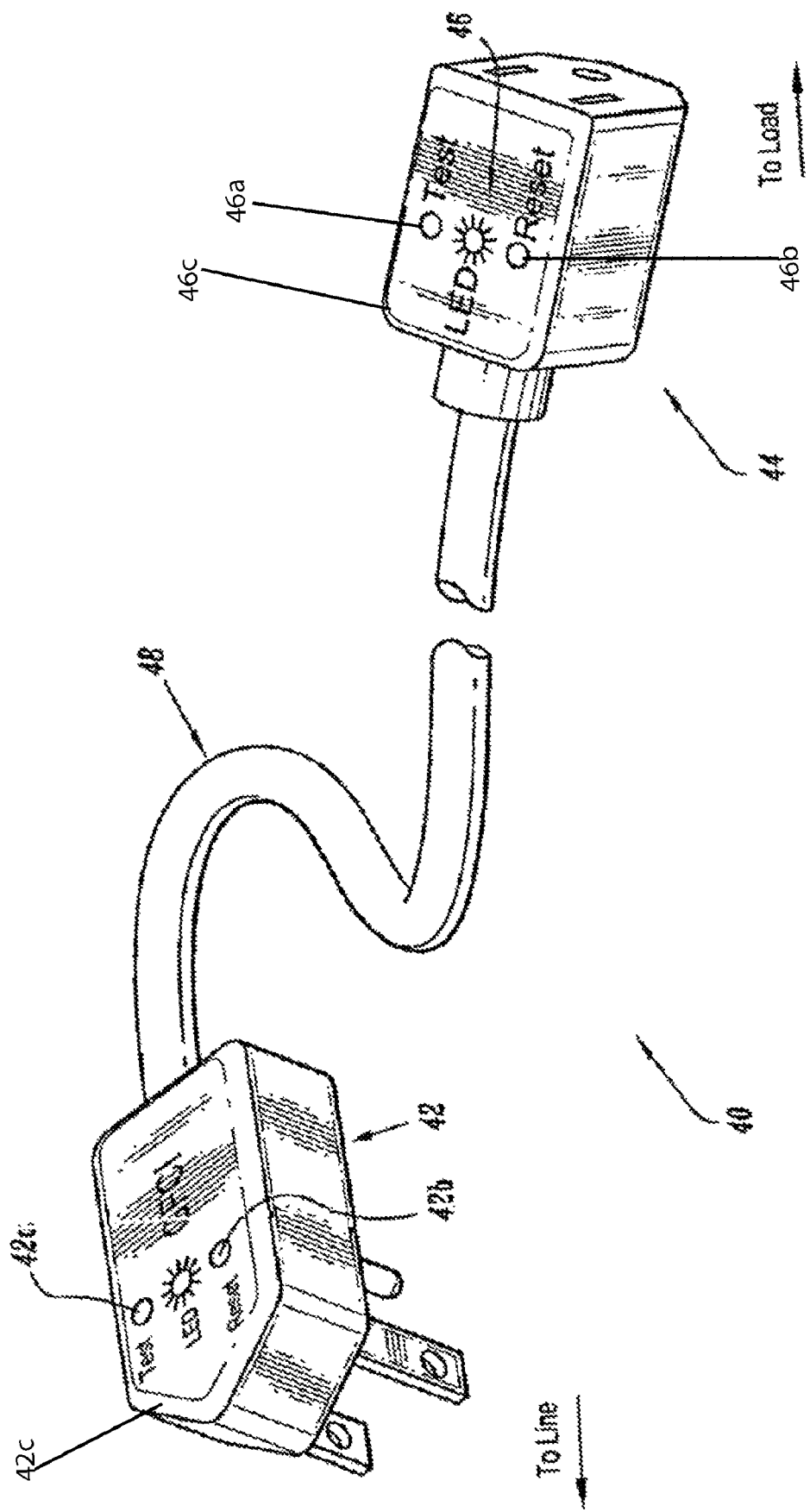
FIG. 2 is a diagram of a GFCI with remote test and reset functionality in accordance with another embodiment of the present disclosure.

FIG. 2 illustrates another embodiment of a portable circuit interrupting system 40 with remote test and reset functionality. In the embodiment of FIG. 2, the circuit interrupting device described above is included in a plug assembly 42 capable of connecting to a fixed source of electrical power, e.g., a wall mounted outlet (not shown), to provide electrical power to a load. The plug assembly 42 has a power cord or cable 48 ending in a connector 44 (e.g., a female receptacle) for connection to an electrical load, such as a vending machine or other commercial, industrial or home electrical machine (not shown). This would apply equally to an apparatus which is hard wired to the load. In this embodiment, plug assembly 42 includes a line side that has prongs for connecting to the fixed source of electrical power and a load side connected to the power conductors in cable 48. Conductive paths are provided between the line side and load side of the plug assembly. The circuit interrupting device is connected between the line side and load side of the plug assembly 42.

As noted, between the line side and load side of the plug assembly 42 are conductive paths. Typically, in a single phase system or in a multi-phase system there is a conductive path a neutral conductive path and a ground conductive path. The circuit interrupting device includes fault sensing circuitry used to monitor the electrical power flowing through the phase and neutral conductive paths on the line side of the plug assembly 42, and a trip mechanism used to change the state of the circuit interrupting device between a reset state and a tripped state. In the reset state there is electrical continuity in the phase and neutral conductive paths between the line side and load side of the plug assembly 42. In the tripped state there is electrical discontinuity in the phase and neutral conductive paths between the line side and load side of the plug assembly 42. When a fault condition is detected by the fault sensing circuitry the trip mechanism causes the circuit interrupting device to change from the reset state to the tripped state. Examples of the fault conditions the fault sensing circuitry may detect include ground faults, arc faults, appliance leakage faults, immersion detection faults, or equipment leakage faults. The trip mechanism may include electromechanical or electrical components or both to change the state of the circuit interrupting device. That is, the trip mechanism may use electromechanical or electrical components or both to cause electrical discontinuity in the phase and neutral conductive paths between the line side and load side of the circuit interrupting device (the tripped state), or the trip mechanism may use electromechanical or electrical components or both to cause electrical continuity in the phase and neutral conductive paths between the line side and load side of the circuit interrupting device (the reset state).

The circuit interrupting device also includes test circuitry and reset circuitry that is housed in housing 42c and that can be manually activated by buttons 42a, 42b or remotely activated as will be described below. The test circuitry is used to test all or part of the fault sensing circuitry, the trip mechanism or both the fault sensing circuitry and trip mechanism of the circuit interrupting device. The reset circuitry is to cause the trip mechanism to return to the reset state, i.e., to re-establish electrical continuity in the phase and neutral conductive paths, after the circuit interrupting device has been tested or a fault condition detected. Examples of the test circuitry and reset circuitry can be found in commonly owned U.S. Pat. No. 4,595,894, the disclosure of which is hereby incorporated herein by reference. It should be noted that the circuit interrupting device may also include reset lockout functionality to prevent the circuit interrupting device from changing to the reset state in the event all or part of the fault sensing circuitry, all or part of the trip mechanism or all or part of the test circuitry are inoperative. Examples of reset lockout features are described in commonly owned U.S. Pat. No. 6,282,070, the disclosure of which is hereby incorporated herein by reference.

In the embodiment of FIG. 2, the connector 44 includes activating device 46 having a housing 46c and having test and reset buttons 46a, 46b which can be used to remotely activate all or part of the test circuitry, all or part of the reset circuitry or all or part of both. The cable 48 includes power conductors and signal conductors. The power conductors deliver electrical power from the plug assembly 42 to the connector 44. At the plug assembly 42, the signal conductors are connected to the test circuitry and reset circuitry, and at the connector 44 the signal conductors are connected to test and reset buttons 46a, 46b on activating device 46. The signal conductors are used by the activating device 46 to communicate with and remotely activate all or part of the test circuitry, all or part of the reset circuitry or all or part of both.

Figure 3:
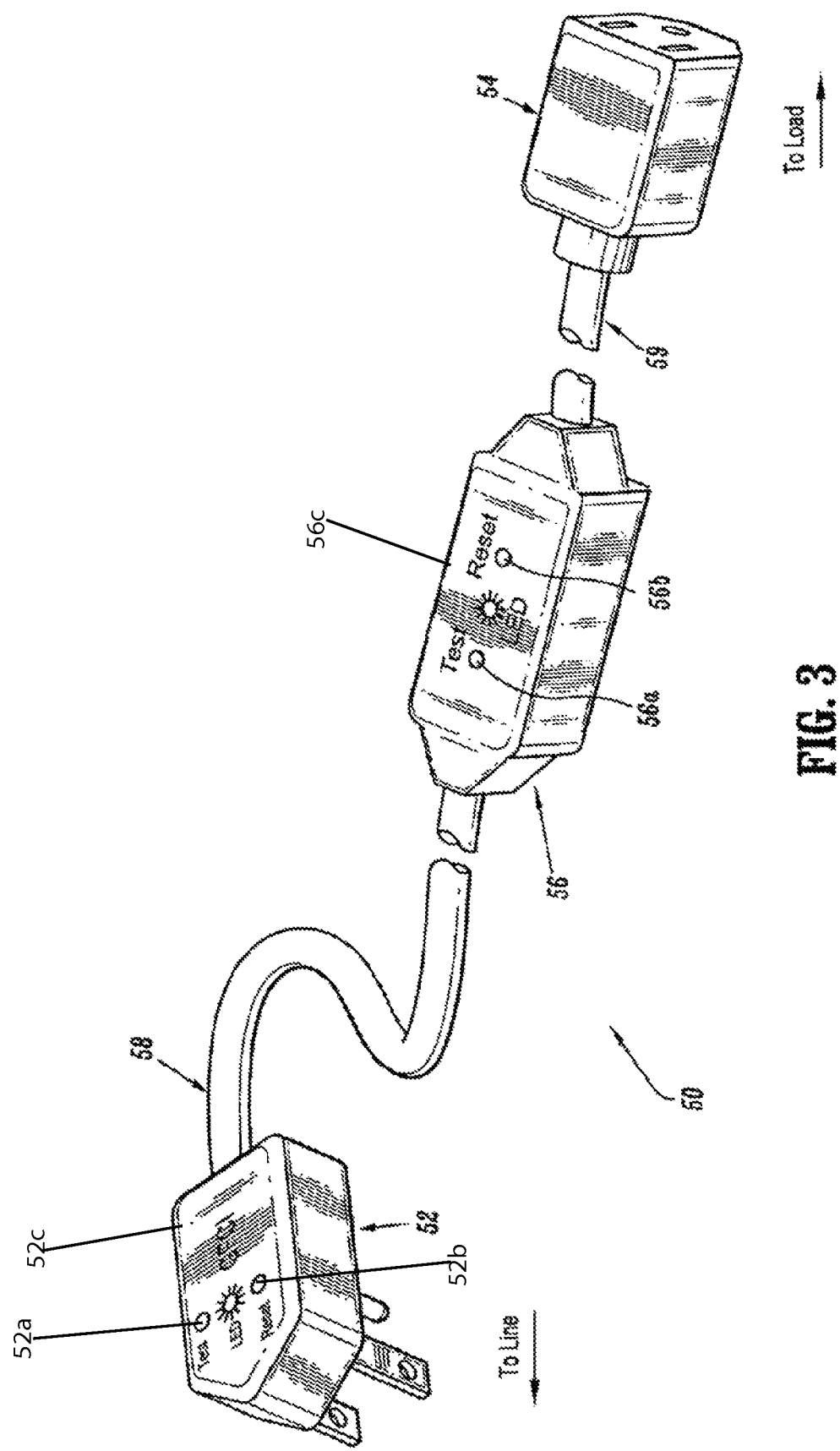
FIG. 3 is a diagram of a GFCI with remote test and reset functionality in accordance with another embodiment of the present disclosure.

FIG. 3 illustrates another embodiment of a portable circuit interrupting apparatus 50 with remote test and reset functionality. In this embodiment, the plug assembly 52 has a housing 52c and test and rest buttons 52a and 52b and is substantially similar to plug assembly 42 and for clarity will not be described further. The remote activation of the test or reset circuitry in the circuit interrupting device is provided by an inline activating device 56 disposed between the plug assembly 52 and connector 54. The activating device 56 has a housing 56c and includes test and reset buttons 56a, 56b which can be used to remotely activate all or part of the test circuitry, all or part of the reset circuitry or all or part of both. The plug assembly 52 is connected to the activating device 56 via cable 58 and connector 54 is connected to the activating device via cable 59. Cable 58 has power conductors and signal conductors. Cable 59 has power conductors. The power conductors deliver power from the plug assembly 52 to the connector 54. The signal conductors in cable 58 are used by the activating device 56 to communicate with and remotely activate all or part of the test circuitry, all or part of the reset circuitry or all or part of both.

Figure 4:
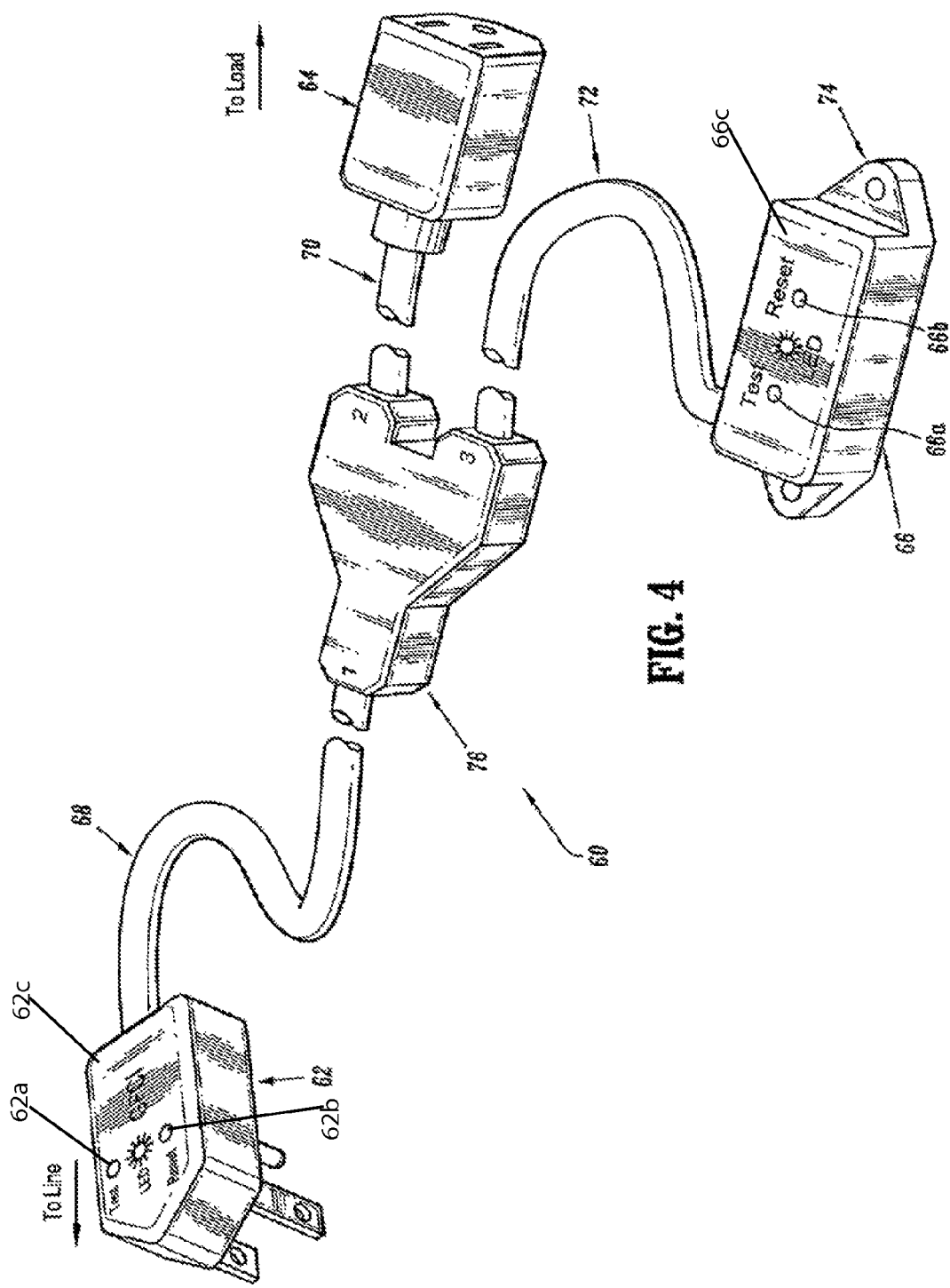
FIG. 4 is a diagram of a GFCI with remote test and reset functionality in accordance with another embodiment of the present disclosure.

FIG. 4 illustrates another embodiment of a portable circuit interrupting apparatus 60 with remote test and reset functionality. In this embodiment, the plug assembly 62 having a housing 62c and test and reset buttons 62a and 62b respectively. This plug assembly 62 is substantially similar to plug assembly 42 described above and for clarity will not be described further, and the remote test and reset functionality is provided by activating device 66. The activating device 66 has a housing 66c and includes test and reset buttons 66a, 66b which can be used to remotely activate all or part of the test circuitry, all or part of the reset circuitry or all or part of both. The activating device may be free standing or may be fixed to, for example, a wall via eyelets 74. In this embodiment, the plug assembly 62 is connected to a first port of a splitter or branching element 76 via cable 68. Cable 68 has power conductors and signal conductors. A cable 70, having power conductors, is connected between the connector 64 and a second port of the splitter 76. A third port of splitter 76 is connected to the activating device 66 via cable 72. Cable 72 has signal conductors. The power conductors deliver electrical power from the plug assembly 62 to the connector 64. The signal conductors in cable 68 and 72 are used by the activating device 66 to communicate with and remotely activate all or part of the test circuitry, all or part of the reset circuitry or all or part of both in the circuit interrupting device.

Figure 5:
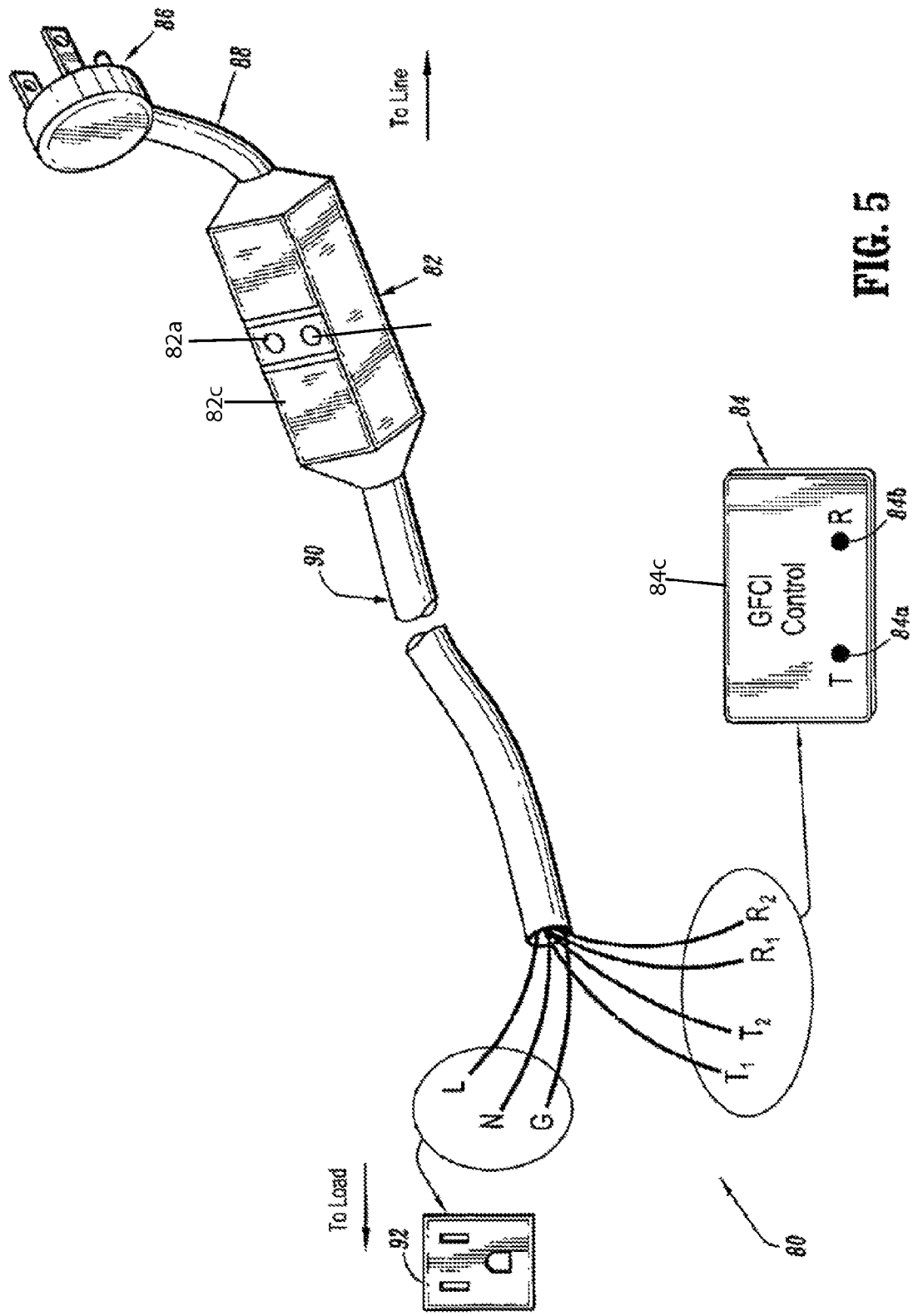
FIG. 5 is a diagram of a GFCI with remote test and reset functionality in accordance with another embodiment of the present disclosure.

FIG. 5 illustrates another embodiment of a portable circuit interrupting apparatus 80 with remote test and reset functionality. In this embodiment, the remote test and reset functionality is provided by activating device 84 connected to the load side of circuit interrupting device 82 through cable 90. Circuit interrupting device 82 has a housing 82c and a test button 82a, and a reset button 82b. The line side of the circuit interrupting device is connected via cable 88 to a plug assembly 86 including prongs. The plug assembly 86 is used to connect the circuit interrupting assembly 82 to a fixed source of electrical power, e.g., a wall mounted outlet (not shown), to provide electrical power to a load (not shown), such as a vending machine or other commercial, industrial or home electrical machine. The circuit interrupting device is substantially similar to the circuit interrupting device 12 described above and for clarity will not be described further.

The activating device 84 includes a housing 84c and test and reset buttons 84a, 84b which can be used to remotely activate all or part of the test circuitry, all or part of the reset circuitry or all or part of both. The activating device 84 may be configured as a panel capable of being mounted to a surface of an object, such as wall or a machine.

As noted, the load side of the circuit interrupting device 82 is connected to the activating device 84 via cable 90. Cable 90 includes power conductors (Phase (L), Neutral (N) and Ground (G)) and signal conductors (T1, T2, R1, R2). The power conductors provide power to a load, the signal conductors T1, T2 are connected to the test button 84a, and the signal conductors R1, R2 are connected to reset button 84b. This feature would apply equally well to a multi-phase system.

Figure 6:
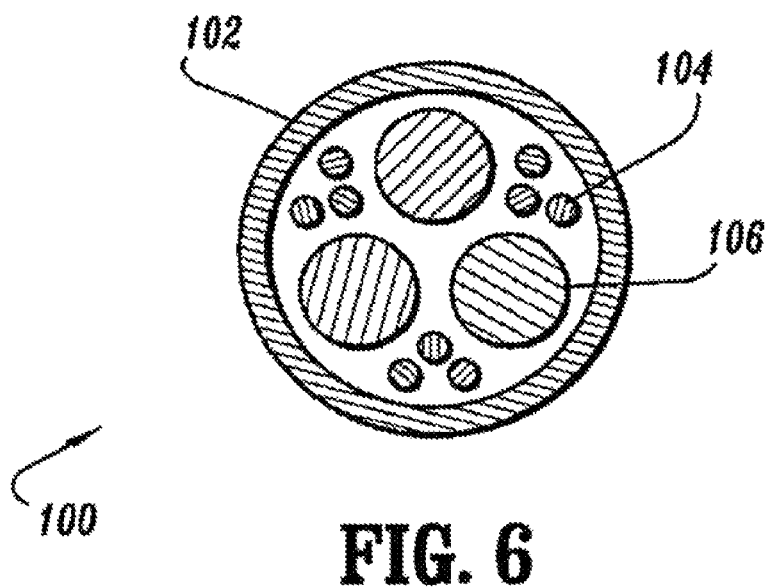
FIG. 6 is a cross-sectional view of a cable for use with a GFCI with remote test and reset functionality in accordance with an embodiment of the present disclosure.

FIG. 6 is a cross-sectional view of a cable 100 that may be used with the various embodiments of a portable circuit interrupting apparatus. The cable 100 includes an outer sheathing 102 having three power conductors 106 and three pairs of signal conductors 104. The power conductors 106 are used to carry electrical power over standard power lines (Phase, Neutral and Ground). Each pair of the signal conductors 104 is used to carry or handle signals between an activating device (e.g., activating device 16 of FIG. 1, activating device 46 of FIG. 2 activating device 56 of FIG. 3, activating device 66 of FIG. 4, or activating device 84 of FIG. 5) and a circuit interrupting device or plug assembly. These signal conductors 104 can be in any form such as a wire or other metallic based communication lines, such as an Ethernet cable, in the form of a fiber optic line, or any suitable communication medium.

Figure 7:
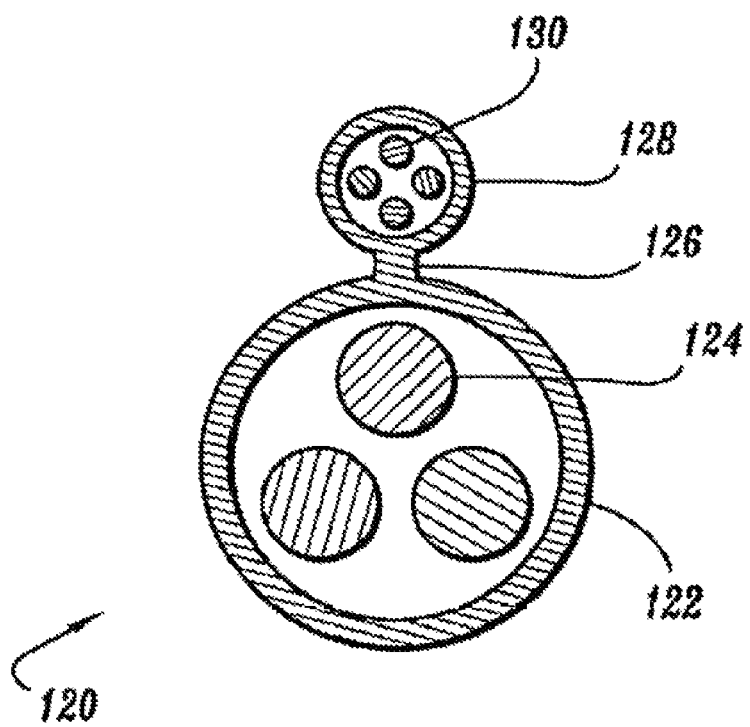
FIG. 7 is a cross-sectional view of a cable for use with a GFCI with remote test and reset functionality in accordance with another embodiment of the disclosure.

FIG. 7 is a cross-sectional view of another embodiment of a cable that may be used with the various embodiments of a portable circuit interrupting apparatus. In this embodiment, the cable 120 has two components, a power cable 122 and a signal cable 128. The power cable 122 has three power conductors 124 used to carry electrical power. The signal cable 128 has two pairs of signal conductors 130. Each pair of the signal conductors 130 is used to carry or handle signals between an activating device and a circuit interrupting device or plug assembly. Preferably, the power cable 122 is coupled to but electrically isolated from the signal cable 130. These signal cables 130 can be in any form such as in the form of a wire, or other metallic based communication lines, such as an Ethernet cable, in the form of a fiber optic line or any suitable communication medium.

Figure 8A:
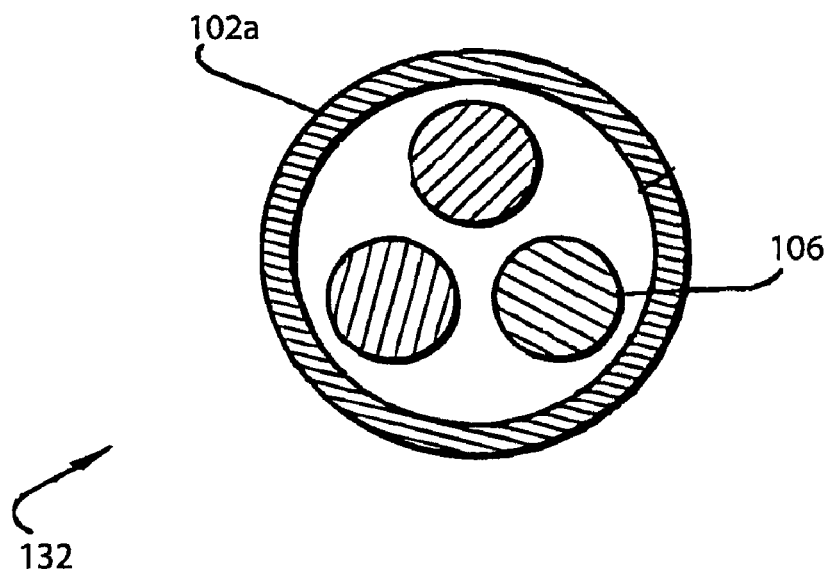
FIG. 8A is a cross-sectional view of a cable with a GFCI with remote test and reset functionality which communicates through electrical lines.

FIG. 8A is a cross-sectional view of another embodiment of a cable that may be used with the various embodiments of a portable circuit interrupting apparatus. In this embodiment, there are three power conductors 106 similar to those shown in FIGS. 6 and 7, however, in this embodiment the communication signals between the activating device such as activating device 16 of FIG. 1, or other activating devices 46, 56, 66, 84, or 116 and any one of the circuit interrupting devices 12, 42, 52, 62, 82, or 112 are carried on the three power conductors 106. This communication means is possible because these communication signals are being communicated via an X-10 or other suitable power line communication protocols. In this case, "X-10" is a communications "language" that allows compatible products to communicate with each other using the existing electrical wiring in the home. X-10 communication means have been used for other purposes wherein this communication protocol is disclosed in U.S. Pat. No. 5,777,544 to Vander Mey et al, which issued on Jul. 7, 1998, the disclosure of which is hereby incorporated herein by reference. While X-10 communication protocol has been disclosed above, any suitable protocol can be used.

Figure 8B:
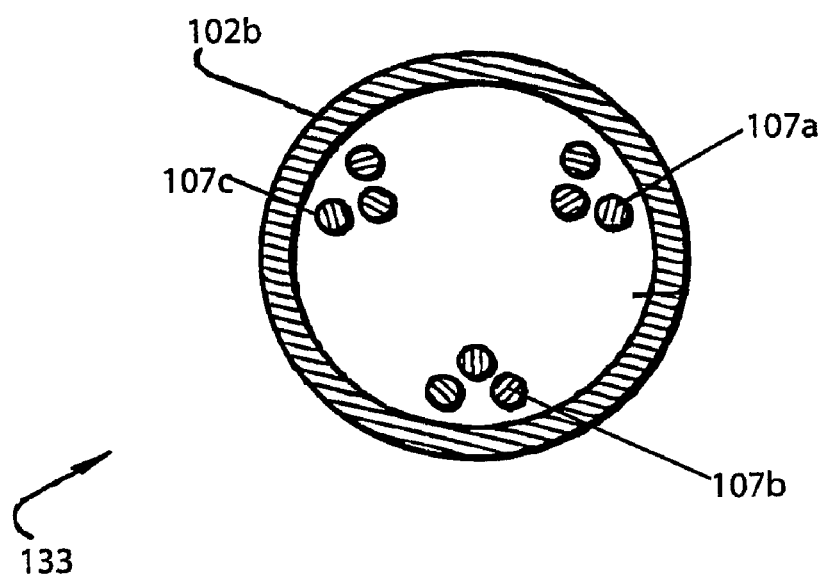
FIG. 8B is a cross-sectional view of a cable with a GFCI with remote test and reset functionality which communicates through electrical lines without power lines.

FIG. 8B shows another type of line or cable 133 which includes a sheath 102b, and a plurality of signal cables 107a, 107b, and 107c. This line or cable 133 is configured to communicate signals from one component to another. For example, one end of this cable 133 is connected to a housing of the circuit interrupting device 12, and the GFCI disposed therein, and the other end is connected to the remote control unit housing 16 and the electrical components housed therein. This type cable can also be used for cables 152b and 153 to communicate between components such as activating devices 46, 56, 66, 84, or 116 and any one of the circuit interrupting devices 12, 42, 52, 62, 82, or 112, where the connection does not require a power cable.

The circuit interrupting devices, plug assemblies and the activating devices described above may include an audio indicator (e.g., buzzer), a visual indicator (e.g., light emitting diodes) or both as indicator means to provide users with an indication of the status of the circuit interrupting device, or any other suitable indicator.

With the embodiments disclosed above, the signal lines 104, and 130, or communication power line 106 can also be adapted to allow for two-way communication between the activating devices such as activating devices 16, 46, 56, 66, 84, or 116 and the circuit interrupting device. Alternatively, FIG. 9A discloses another embodiment of the invention wherein with this design, there is an optional remote monitoring device 150 which in this embodiment, is in wired communication with activating device 116 via a wired communication line 152b (See FIG. 10A) which can be formed similar to any one of wired lines 100, 120 or 132 which can be used to relay signals back and forth between the devices.

Alternatively, as also shown in FIG. 9A, remote control device 150 can communicate with any one of different remote activating devices 114, 116, or 118 (See FIG. 10B) in a wireless manner. This wireless communication can be in the form of any suitable wireless communication such as 802.11x, bluetooth or any other available wireless protocol.

Figure 10A:
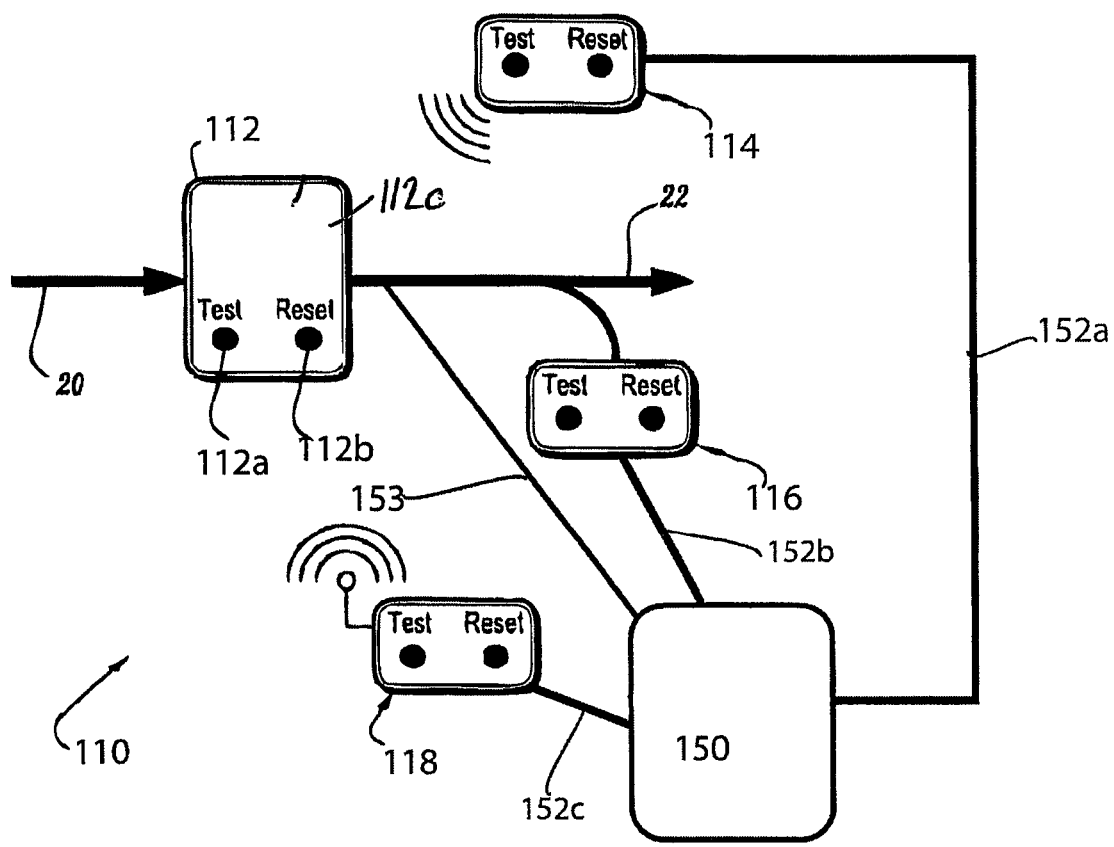
FIG. 10A is another embodiment of this disclosure wherein the device has a remote test and reset functionality, wherein there is also a remote device for controlling the remote control device or the fault circuit interrupter in a wired manner.
Figure 10B:
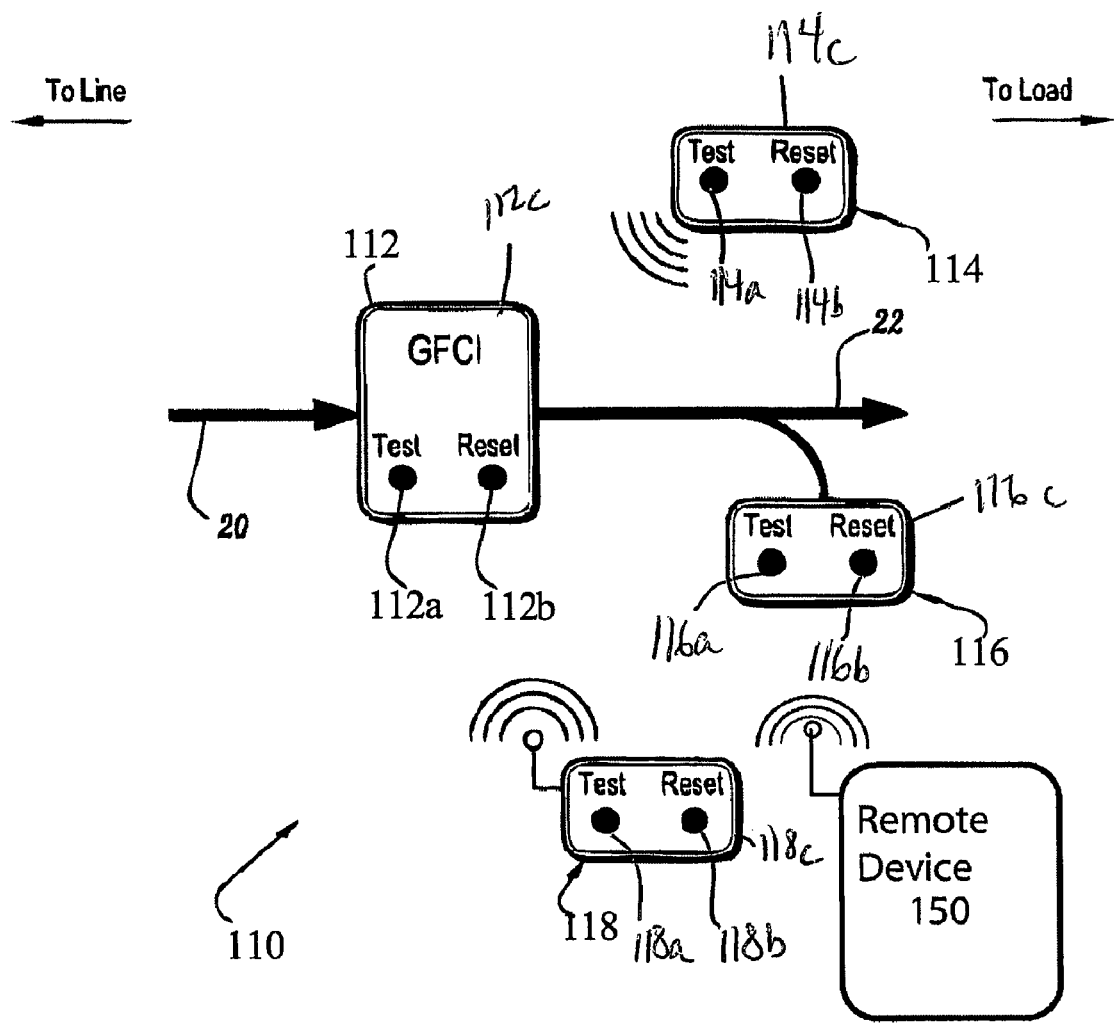
FIG. 10B is another embodiment of the disclosure wherein the device has a remote test and reset functionality, wherein there is also a remote device for wirelessly communicating with and remotely controlling the activation device or the fault circuit interrupter in a wireless manner.

As shown in FIGS. 10A and 10B remote activating devices 114 and 118 can then communicate with circuit interrupting device 112 in a wireless manner, while remote activating device 116 can communicate with circuit interrupting device 112 in a wired manner. This form of wired communication can be via any suitable or known wired communication lines such as any one of the lines shown in FIG. 6, 7, or 8. The wireless communication between activating device 114 can be in the form of an infrared protocol. The wireless communication between activating device 118 can be in the form of a radio frequency protocol, which can be in the form of any suitable radio frequency protocol. FIGS. 10A and 1013 show that circuit interrupting device 112 has a test button, 112a, a reset button 112b and a housing 112c. Remote activating device 114 has a test button 114a, a reset button 114b and a housing 114c, remote activating device 116 has a test button 116a, a reset button 116b and a housing 116c, while remote activating device 118 has a test button 118a, a reset button 118b and a housing 118c.

In this case, remote device 150 can be any type of remote device such as a personal computer or (PC) having an automation software, a computer server, or a commercial or industrial monitoring system such as used in fire alarm systems. This remote device 150 can be in the form of a computer or server and have incorporated therein any necessary components such as a processor, a memory unit, a mass storage device or hard drive.

This device 150 can also have an associated monitor or display as well to display the status of the actuating device or the fault circuit interrupter device. This type display can be in the form of a graphical display or via a text messaging display. In addition, remote module 150 can also forward on the status of the activating device or the fault circuit interrupting device to other remote devices such as other computers, pagers, cell phones, or other communication devices, in the form of text messages or graphical representations as well. With this type of communication, a user of this system would not have to be physically near either the fault circuit device 12, or 112 or the associated activating devices to constantly check the status of these devices. For example, FIGS. 9A-9C also show remote module 150 which can optionally connect to mobile devices 154 such as cell phones, pagers, or any other known or suitable mobile devices, or to a wide area network such as the internet 155 to allow for additional off-site communication.

FIG. 9B shows a schematic block diagram of remote control device or remote activating device 150 which is in communication directly with circuit interrupting device 112. Remote control device 150 can communicate from a near or far distance via a wired communication line 153 which can be formed from lines shown in any one of FIG. 6, 7, or 8 or any other wired lines. This communication can be directly with circuit interrupting device 112 to either monitor and display a status of circuit interrupting device 112 or to selectively activate circuit interrupting device 112 as well. This level of control can be in the form of remotely activating the test circuitry 220, 225 (See FIG. 12) or the reset circuitry 230, 235. The wired communication can be via any known or suitable protocols such as via a TCP/IP protocol, X-10 or any other available or known or suitable protocol in the art. These remote control devices are not limited to any particular device and can include a computer, a computer workstation, a desktop computer, a laptop computer, a server, a personal digital assistant, a telephone, a cellular telephone, and a text messaging device. These devices can send and receive any known wireless communication protocols, wired or wireless commands, or wired communication protocols.

Alternatively, the communication between remote control device 150 can be in the form of wireless communication such as via wireless, 802.11x, short-range personal area network, or any other known or suitable wireless communication protocols such as but not limited to: short range wireless specification (sold under the trademark "Bluetooth"); all IEEE 802 channels; Digital Enhanced Cordless Telecommunications (DECT); Cellular; wireless sensor technology (sold under the trademark "ZigBee EnOcean"); personal area networks; UltraWideband (UWB); WLAN (Wireless Local Area Network); WMAN (Wireless Metropolitan Area Network); Broadband Fixed Access; Local Multipoint Distribution Service (LMDS); WiMax; (Worldwide Interoperability for Microwave Access); HiperMAN (High Performance Radio Metropolitan Area Network); optical; audio, sonic, or radio communication.

Also any known wired protocol can be used such as but not limited to TCP/IP; "X-10"; Universal Powerline Bus (UPB); KNX, INSTEON, BACnet (Building, Automation and Control networks), and LonWorks, and any known protocols for transmission over lines such as telephone lines and Ethernet lines.

In addition, both the remote devices 150, 151, 154, the remote activating devices 114, 116, and 118, and the circuit interrupting devices can include addressable circuitry as is known in the art such as for example, a network interface card or an addressable wireless transceiver for use over a TCP/IP network for allowing for addressing and location on a computer network.

FIG. 9C is another schematic block diagram showing remote control device 150 which is shown communicating either directly with fault circuit interrupting device 112, or indirectly with fault circuit interrupting device 112 through an additional communication or control device 151. Additional communication or control device 151 can be in the form of a personal computer, or a router. For example, remote control device 150 can be in the form of a server that controls additional remote control device 151, or communicates through this remote control device 151 to communicate with fault circuit interrupter 112.

Figure 11A:
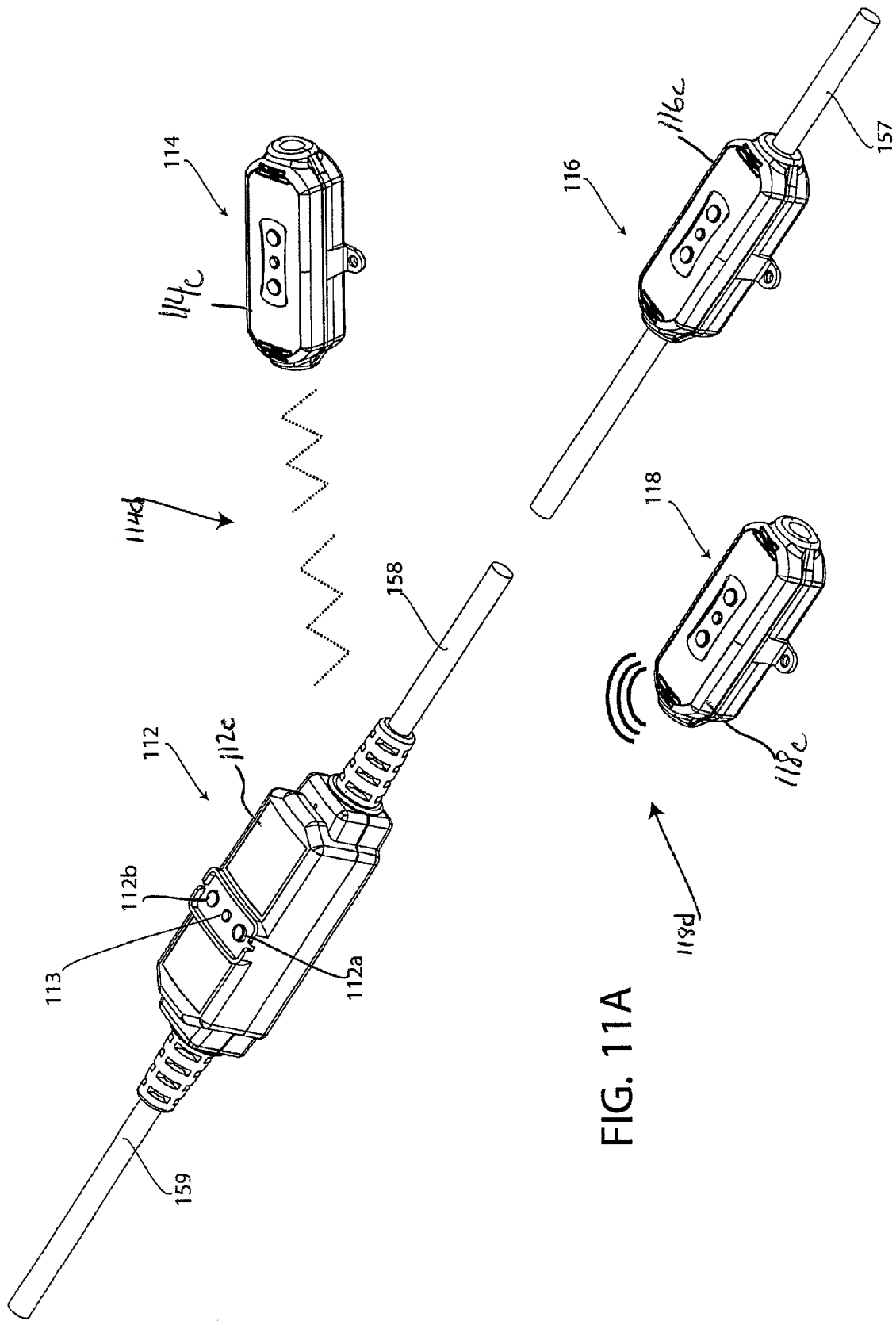
FIG. 11A is a perspective view of another embodiment of an in-line activation device for communicating with a fault circuit interrupter device.

FIG. 11A discloses another embodiment of the remote activation device 116 which is in wired communication with a GFCI control device/fault circuit device 112 through wired line 158. Fault circuit device 112 includes a test button 112a, a reset button 112b and an indicator light 113.

Remote activation device 116 acts on circuit interrupting device 112 in a similar manner as one or more of activating devices 14, 16, or 18 would act on circuit interrupting device 12. In this view, a wire input line 152b which can be similar to lines 100, 120, or 132 is coupled into remote activation device 116. Line 152b allows for bi-directional communication which can lead to other fault circuits or to remote monitoring device 150 (See FIGS. 9A-9C). Line 158 connects remote activation device 116 with fault circuit interrupter 112 and can be in any desired form and for example, can be similar in configuration to any one of lines 100, 120 or 132, wherein this line 158 allows for bi-directional communication between fault circuit device 112 and remote activation device 116. Line 159 is coupled between fault circuit device 112 and the device being controlled such as a vending machine or freezer or any other useful product. Line 159 can include communication lines, but could also be simply in the form of a power line connecting fault device 112 with the desired load.

In addition, there can be alternative configurations of the remote activation device, wherein remote activation device 114 is designed to communicate with infrared communication via signals 114d between remote activation device 114 and fault circuit device 112. This type of communication can be a two-way communication wherein signals transmitted from remote activation device 114 could be used to activate or test fault device 112, while the signals transmitted back to remote activation device 114 could be in the form of information relating to the status of fault circuit device 112, such as whether fault circuit needs to be reset. Alternatively, remote activation device 118 can communicate in a bi-directional manner as well, relaying information or commands between remote activation device 118 and fault circuit 112 via RF or WIFI communication protocol 118d.

Figure 11B:
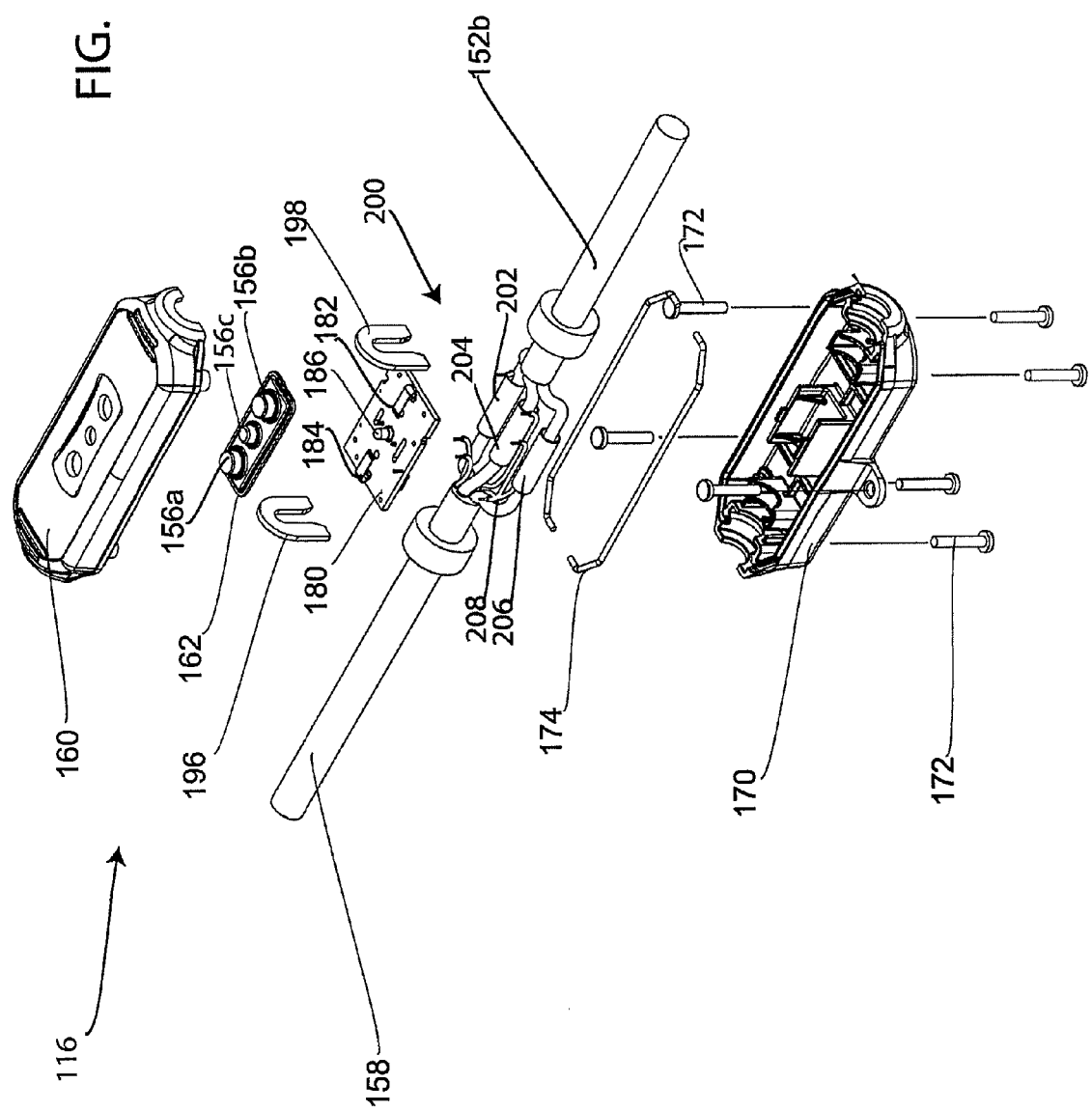
FIG. 11B is an exploded view of the in line activation device.

FIG. 11B is an exploded perspective view of the remote activating device 116, which includes a top cover 160, which connects to a bottom cover 170 via screws 172 and a gasket 174 disposed in between. Top cover 160 and bottom cover 170 form a housing which enclose a circuit board 180. In addition, disposed below top cover 160 is a series of buttons including a test button 156a, a reset button 156b as well as an LED light indicator cover 156c all formed in a lens assembly 162. Buttons 156a and 156b connect to circuit board 180 via respective contacts 182 and 184. LED light 186 is disposed below LED light cover 156c and is used to indicate the condition of the fault interrupter 112. (See FIG. 11A).

In addition, disposed inside of this housing are strain relief clips 196 and 198 which can be of any necessary shape but in this view are shown as U-shaped and connect over a wire connection section 200 of line 152b. Wire connection section 200 includes three different sets of wires 202, 204, and 206 which can be crimped or coupled together in any known way. Wire line 202 includes associated communication lines 208 which can be coupled into circuit board 180 for communication with circuit board 180. Circuit board 180 can also be electrically coupled to any one of power lines 202, 204, or 206 in any known manner to derive power from these lines.

Figure 12:
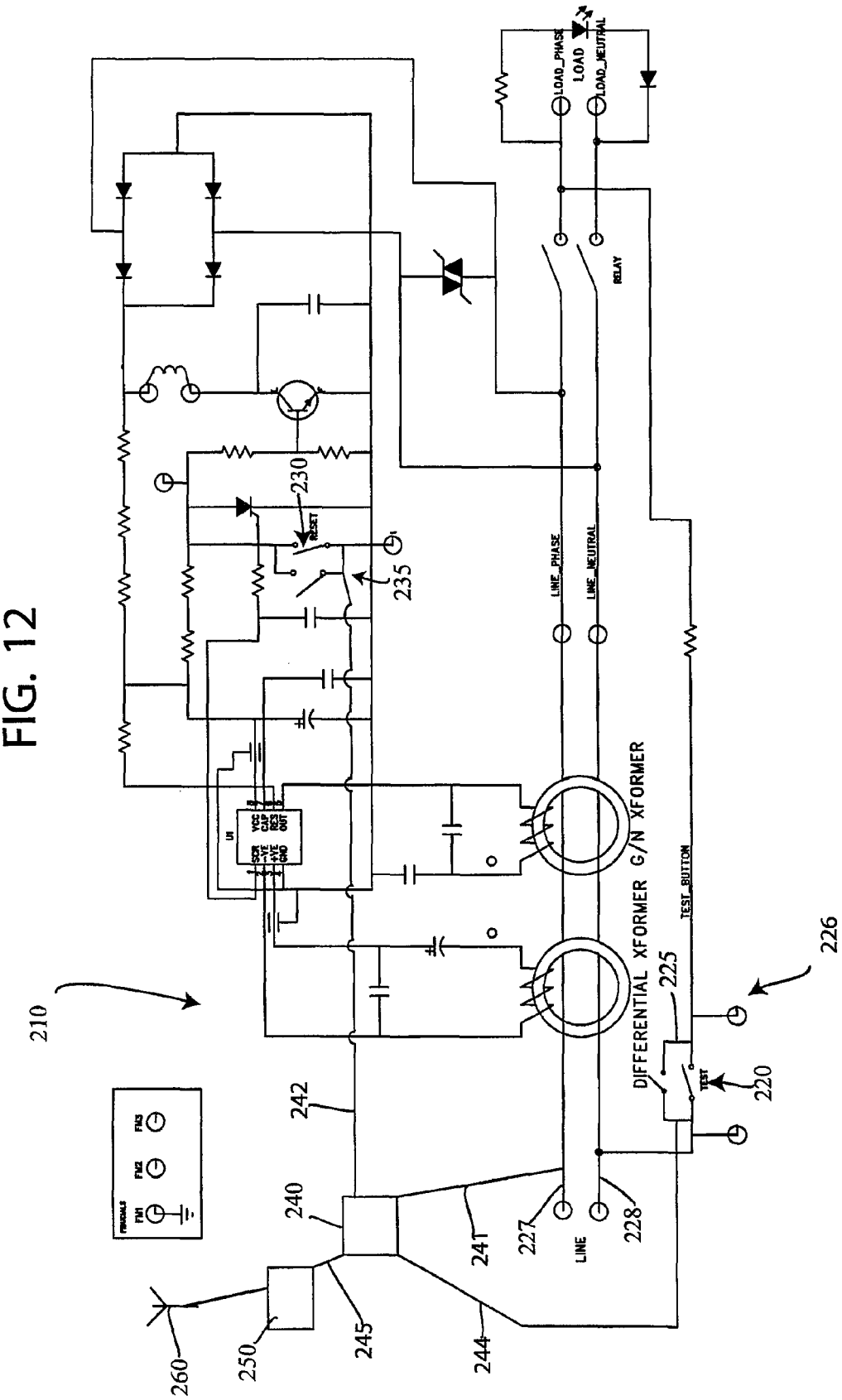
FIG. 12 is a circuit diagram of the electronic components in a circuit board shown in FIG. 11B.

FIG. 12 shows a schematic block diagram of a fault circuit interrupter circuit 210 which can be disposed inside of fault circuit devices 12, 42, 56, 82, or 112. The basic components of this circuit are discussed in greater detail in U.S. Pat. No. 6,864,766 to DiSalvo et al, wherein the disclosure of which is hereby incorporated herein by reference.

This circuit includes test switch 220, and reset switch 230. Test switch 220 has an associated override switch 225 which is coupled in parallel with test switch 220. There is also a reset override switch 235 which is coupled in parallel with reset switch 230. Coupled to both test override switch 225 and reset override switch 235 is a controller 240. In addition, coupled to controller 240 is a transceiver 250. In an alternative design, controller 240 and transceiver 250 can be incorporated into a single electronic component in any known way. This transceiver 250 can also be coupled to an antenna 260 for transmitting and receiving signals to and from a wireless remote controlling device 150 or a wireless activating device 18 or 118.

With this design, circuit interrupting device 12, 112 can communicate directly with a remote control device 150 without the need for an activating device 14, 16, 18, 114, 116, or 118. Instead, remote control device 150 can act as a remote monitoring device simply monitoring the status of circuit interrupting device 12, or 112, or monitor the status of the load connected to circuit interrupting device 12 or 112. For example, the monitoring features could be designed to read both the status of the test and reset circuitry, and also whether the load, such as a vending machine, or any other type load is for example, electrically coupled and drawing power from circuit interrupting device 12 or 112. If the load is capable of communicating any additional information on its status, then this information could be communicated to remote control device 150 via any known means such as wireless or wired communication.

Remote control device 150 can also act as a remote actuation device as well. In this case, the communication can be via wireless communication such as though transceiver 250, or through wired communication means. Depending on the information sent from remote control device 150, this device could then be used to control the circuit interrupting device via remote control switch 225 for the test circuitry or via remote control switch 235 for the reset circuitry. Other control information could also be passed on from the circuit interrupting device to control the load directly in any known manner.

For example, signals are sent wirelessly to antenna 260 and are then passed on to transceiver 250, wherein these signals are then processed in controller 240. This information is then sent on to selectively control test switch circuitry 225 or reset switch circuitry 235. If the communication is via wired lines, then this information can be passed on to phase line 227 or neutral line 228 via X-10 or other powerline communication protocols. Alternatively, the wired connection can feed information into this circuit 210 via communication contact lines 226 via communication lines 104 or 120

Ultimately with this design, a fault circuit interrupting device 12, 42, 56, 82, or 112 can be controlled from multiple different locations either via wirelessly or in a wired mode.

Figure 13:
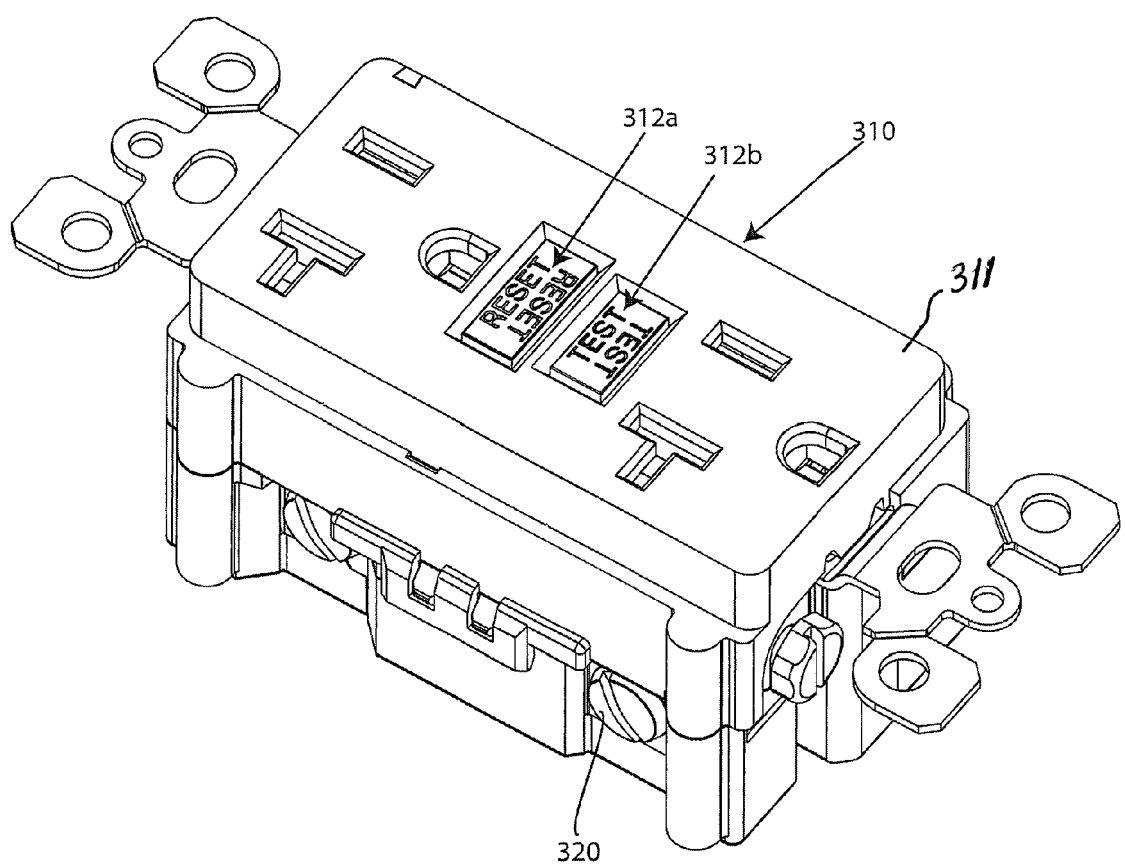
FIG. 13 is a perspective view of another embodiment.

FIG. 13 is a perspective view of anther embodiment which is a wall unit for insertion into a single gang electrical enclosure. This type of device could also be inserted into a double gang or other sized enclosure as well. The enclosures could be in the form of a wall box which is recessed into a wall in a known manner. As shown, this fault circuit device 310 includes a housing 311, a reset button 312a which is similar to reset button 112a, a test button 312b which is similar to test button 112b. This device also includes metal contacts 320 which allow power lines to be connected thereto. Thus, with this design, if the power lines conduct signals such as through the "X-10" protocol, a remote device such as remote monitoring device 150 could be used to communicate with this device. Alternatively, this device could include the circuitry as shown in FIG. 12 which would also be designed to allow wireless communication with remote monitoring devices as well. Thus, this device could be remotely activated or monitored while being inserted into a wall box.

Figure 14:
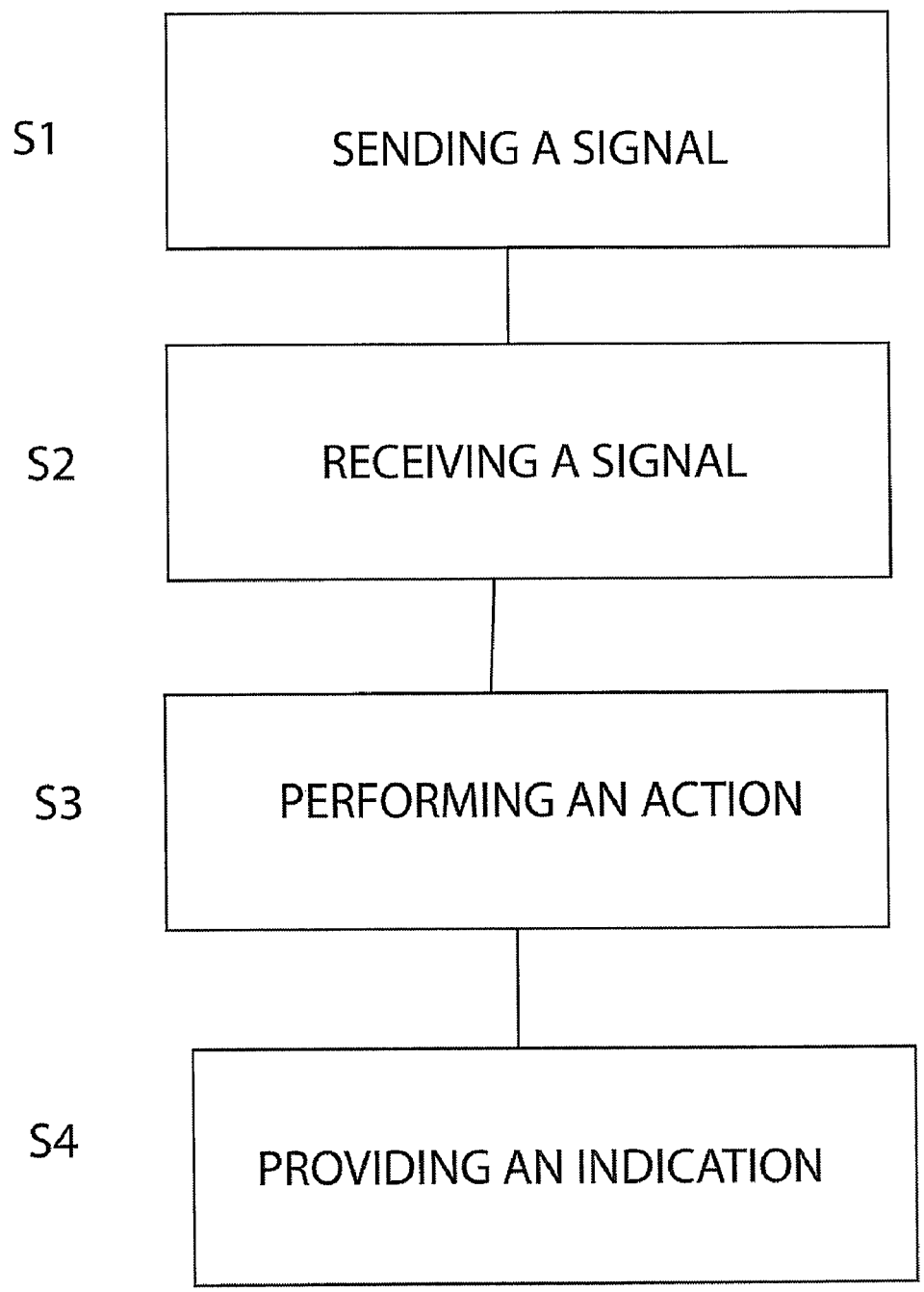
FIG. 14 is a flow chart for a process for remotely accessing a circuit interrupting device.

As shown in FIG. 14, there is also a method for remotely testing a circuit interrupting device such as but not limited to devices 12, 42, 52, 62, 82, or 112. The method comprises a series of steps, including a first step S1 of sending a signal from a remote location or a remote device such as but not limited to devices 14, 16, 18, 46, 56, 66, 84, 114, 116, 118, 150, or 154, to a circuit interrupting device, wherein this signal comprises at least one of a test signal and a reset signal. Next, step S2 involves receiving a signal by the circuit interrupting device. Once the signal is received, step S3 involves performing an action on at least one component of the circuit interrupting device wherein this action comprises at least one of a test of one of the components of the circuit interrupting device and a reset of the circuit interrupting device. This method for remote testing can also optionally include a step S4 of providing an indication of a result of the test of at least one component in the circuit interrupting device. This indication step can include any one of providing at least one of a visual indication, an audio indication, or sending a signal from the circuit interrupting device to a remote testing device to indicate a result of the test.

When the component is tested, the testing step can comprise testing the circuit interrupting device to determine if the circuit interrupting device is operating properly. This step of testing such as in step S3 can include testing at least one component by tripping at least one set of contacts such as contacts 235 of the circuit interrupting device.

The above steps can be performed using wireless technology such as any known wireless technology such as from the group of: 802.11x; all IEEE 802 channels; Digital Enhanced Cordless Telecommunications DECT; Cellular; personal area networks; UltraWideband (UWB); WLAN; WMAN; Broadband Fixed Access; Local Multipoint Distribution Service (LMDS); WiMax; HiperMAN.

While there have been shown and described various features and embodiments of a portable circuit interrupting assembly, it will be understood that various omissions and substitutions and changes of the form and details of the devices illustrated and in their operation may be made by those skilled in the art without departing from the spirit of the subject matter of the present disclosure.

What is claimed is:

1. A portable interrupting apparatus comprising:
a) a cable having at least a first end and a second end;
b) a plug disposed at said first end of said cable for engaging a receptacle;
c) a connector disposed at said second end of said cable for releasable connection to another electrical component;
d) a circuit interrupting housing;
e) a circuit interrupting device, coupled between said plug and said connector, and at least partially disposed within said circuit interrupting housing; and
f) at least one remote activating device comprising a remote housing;
wherein said circuit interrupting device is in communication with said at least one remote activating device and wherein said circuit interrupting device has at least one activator, and said at least one remote activating device has at least one activator, resulting in a portable circuit interrupting device that can be tested and reset via at least two different devices in at least two different locations.

2. The apparatus as in claim 1, wherein said at least one activator of said at least one remote activating device comprises at least one of a test button and a reset button and wherein said at least one activator of said circuit interrupting device comprises at least one of a test button and a reset button to respectively test and reset said circuit interrupting device.

3. The apparatus as in claim 1, further comprising at least one communication line comprising at least one of an Ethernet line and a fiber optic line.

4. The apparatus as in claim 1, wherein said at least one communication line is disposed in said cable.

5. The apparatus as in claim 1, wherein said at least one remote activating device communicates with said circuit interrupting device via X-10 protocol.

6. The apparatus as in claim 1, wherein said at least one remote activating device communicates with said circuit interrupting device via TCP/IP protocol.

7. The apparatus as in claim 1, further comprising at least one additional cable and at least one branching element wherein said at least one branching element is coupled to said cable and said at least one additional cable is coupled to said at least one branching element.

8. The apparatus as in claim 7, wherein said at least one remote activating device is coupled to said at least one additional cable.

9. The apparatus as in claim 1, wherein said at least one remote activating device further comprises addressable circuitry which allows said at least one remote activating device to be identified on a network.

10. The apparatus as in claim 9, wherein said addressable circuitry is coupled to said circuit interrupting system for identification of said circuit interrupting system on a network.

11. The apparatus as in claim 1, wherein said at least one remote activating device comprises at least one of a transmitter and receiver configured to communicate with said circuit interrupting device.

12. The apparatus as in claim 11, wherein said at least one remote activating device communicates with said circuit interrupting device via a wireless protocol taken from the group consisting of: 802.11x; all IEEE 802 channels; Digital Enhanced Cordless Telecommunications (DECT); Cellular; personal area networks; UltraWideband (UWB); WLAN; WMAN; Broadband Fixed Access; Local Multipoint Distribution Service (LMDS); WiMax; and HiperMAN.

13. The apparatus as in claim 1, wherein said at least one remote activating device is configured to monitor said circuit interrupting device.

14. The apparatus as in claim 1, wherein said at least one remote activating device is in the form of one of: a computer, a computer workstation, a desktop computer, a laptop computer, a server, a personal digital assistant, a telephone, a cellular telephone, and a text messaging device.

15. The apparatus as in claim 1, further comprising at least one additional remote device configured to communicate with said at least one remote activating device.

16. The apparatus as in claim 15, wherein said at least one additional remote device is in the form of one of: a computer, a computer workstation, a desktop computer, a laptop computer, a server, a personal digital assistant, a telephone, a cellular telephone, and a text messaging device.

17. The apparatus as in claim 1, wherein said circuit interrupting device is one selected from the group consisting of: a ground fault circuit interrupter, AFCI, a ELCI, and an ALCI.

18. The apparatus as in claim 17, further comprising addressable circuitry disposed in said at least one remote activating device, wherein said addressable circuitry allows said at last one remote activating device to be identified on a computer network.

* * * * *